(12) United States Patent
Bookbinder et al.

(10) Patent No.: US 10,947,149 B2
(45) Date of Patent: Mar. 16, 2021

(54) HALOGEN-DOPED SILICA FOR OPTICAL FIBER PREFORMS

(71) Applicant: Corning Incorporated, Corning, NY (US)

(72) Inventors: Dana Craig Bookbinder, Corning, NY (US); Steven Bruce Dawes, Corning, NY (US); Richard Michael Fiacco, Corning, NY (US); Brian Lee Harper, Painted Post, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 330 days.

(21) Appl. No.: 16/167,830

(22) Filed: Oct. 23, 2018

(65) Prior Publication Data
US 2019/0127264 A1 May 2, 2019

Related U.S. Application Data

(60) Provisional application No. 62/578,738, filed on Oct. 30, 2017.

(51) Int. Cl.
*C03B 37/014* (2006.01)
*C03B 19/14* (2006.01)
(Continued)

(52) U.S. Cl.
CPC ........ *C03B 37/014* (2013.01); *C03B 19/1461* (2013.01); *C03B 37/01446* (2013.01);
(Continued)

(58) Field of Classification Search
CPC ............ C03B 37/014; C03B 37/01446; C03B 37/01453; C03B 37/01853; C03B 2201/20
See application file for complete search history.

(56) References Cited

U.S. PATENT DOCUMENTS 5,591,683 A 1/1997 Stempin et al.
5,665,132 A 9/1997 Ruppert et al.
(Continued)

OTHER PUBLICATIONS

Bookbinder et al; "Low Loss Optical Fiber With Core Codoped With Two or More Halogens"; Filed as U.S. Appl. No. 16/193,819, filed Nov. 16, 2018; 35 Pages ID27953.
(Continued)

*Primary Examiner* — Jason L Lazorcik
(74) *Attorney, Agent, or Firm* — Kevin L. Bray

(57) ABSTRACT

Preparation of halogen-doped silica is described. The preparation includes doping silica with high halogen concentration and sintering halogen-doped silica to a closed-pore state. The sintering includes a high pressure sintering treatment and a low pressure sintering treatment. The high pressure sintering treatment is conducted in the presence of a high partial pressure of a gas-phase halogen doping precursor and densifies a silica soot body to a partially consolidated state. The low pressure sintering treatment is conducted in the presence of a low partial pressure of gas-phase halogen doping precursor and transforms a partially consolidated silica body to a closed-pore state. The product halogen-doped silica glass exhibits little foaming when heated to form fibers in a draw process or core canes in a redraw process.

20 Claims, 8 Drawing Sheets

(51) Int. Cl.
*C03C 13/04* (2006.01)
*C03C 3/06* (2006.01)
*G02B 6/02* (2006.01)
*C03B 37/018* (2006.01)

(52) U.S. Cl.
CPC .. *C03B 37/01453* (2013.01); *C03B 37/01853* (2013.01); *C03C 3/06* (2013.01); *C03C 13/045* (2013.01); *G02B 6/02* (2013.01); *C03B 2201/08* (2013.01); *C03B 2201/10* (2013.01); *C03B 2201/12* (2013.01); *C03B 2201/14* (2013.01); *C03B 2201/20* (2013.01)

(56) References Cited

U.S. PATENT DOCUMENTS

| | | | | |
|---|---|---|---|---|
| 6,116,055 | A * | 9/2000 | Ishikawa | C03B 37/01446 65/399 |
| 6,343,175 | B1 * | 1/2002 | Sasaoka | C03B 37/01446 385/123 |
| 8,484,997 | B2 | 7/2013 | Hoff et al. | |
| 9,594,212 | B2 | 3/2017 | Bookbinder et al. | |
| 9,618,692 | B2 | 4/2017 | Berkey et al. | |
| 2002/0097970 | A1 | 7/2002 | Sasaoka | |
| 2003/0079504 | A1 * | 5/2003 | Boek | C03B 37/0146 65/424 |
| 2004/0007026 | A1 * | 1/2004 | Ishihara | C03B 37/01446 65/422 |
| 2006/0115913 | A1 * | 6/2006 | Orita | C03B 37/02754 438/22 |
| 2006/0130529 | A1 * | 6/2006 | Bookbinder | C03B 23/04 65/394 |
| 2014/0352361 | A1 * | 12/2014 | Dawes | C03B 37/01453 65/397 |
| 2016/0011365 | A1 * | 1/2016 | Berkey | C03B 37/01853 385/127 |
| 2016/0109651 | A1 * | 4/2016 | Borel | G02B 6/0365 385/128 |
| 2016/0304392 | A1 | 10/2016 | Bookbinder et al. | |
| 2016/0318792 | A1 * | 11/2016 | Suganuma | C03C 13/046 |
| 2017/0176673 | A1 * | 6/2017 | Berkey | C03C 13/045 |
| 2017/0362115 | A1 * | 12/2017 | Dawes | C03B 37/01453 |
| 2018/0095219 | A1 * | 4/2018 | Bookbinder | G02B 6/02004 |
| 2019/0119143 | A1 * | 4/2019 | Bookbinder | C03B 37/027 |
| 2020/0048136 | A1 * | 2/2020 | Bookbinder | C03B 37/01446 |
| 2020/0049881 | A1 * | 2/2020 | Bookbinder | G02B 6/03627 |

OTHER PUBLICATIONS

International Search Report and Written Opinion PCT/US2018/058100 dated Feb. 22, 2019, 10 Pgs.

* cited by examiner

HALOGEN-DOPED SILICA FOR OPTICAL FIBER PREFORMS

This application claims the benefit of priority to U.S. Provisional Application Ser. No. 62/578,738 filed on Oct. 30, 2017, the content of which is relied upon and incorporated herein by reference in its entirety.

FIELD

This description relates to optical fiber preforms doped with halogens and methods of making such preforms. More particularly, this description relates to preforms for optical fibers made from silica with high concentrations of halogen doping. The preform is a consolidated silica body with low internal gas void volume. The preform exhibits low foaming and void formation when heated for drawing fibers or redrawing to adjust dimensions.

BACKGROUND

Optical fiber performance depends on the ability to control refractive index profiles in low loss fiber media. Most typically, silica glass is used as the base medium for optical fibers used to transmit light over lengths ranging from several meters to hundreds of kilometers. Silica is a preferred base medium because it exhibits low attenuation in the 1300 nm to 1500 nm wavelength range commonly used to transmit optical signals. Attenuation loss in silica-based optical fibers is as low as 0.18 dB/km for single-mode optical fiber. Optical loss is determined by the Rayleigh scattering of the silica-based medium, the concentration of impurities, and wavelength dependent factors such as UV and IR absorption tails.

Optical fibers include a central glass core surrounded by a glass cladding. The base glass medium for the core and cladding is typically silica. To achieve waveguiding, the core is configured to have a higher refractive index than the cladding. The refractive index of silica can be modified by doping. Various dopants are known that either increase or decrease the refractive index of silica relative to undoped silica. In most single mode silica fibers, germanium dioxide ($GeO_2$) is used to dope the core region. $GeO_2$ doping levels are typically adjusted to provide an increase in the relative refractive index of 0.35%. Although $GeO_2$ is a relatively expensive dopant, it comprises only about 8% by weight (wt %) of the core region of the fiber and only about 0.5 wt % of the total glass fiber (core+cladding). Germanium doping is also relatively easy to accomplish during laydown of silica soot and complex refractive index profiles can be made simply by varying the ratio of silicon and germanium precursors supplied to the deposition system during the laydown process (typically an OVD silica soot deposition process). $SiCl_4$ and $GeCl_4$ are common precursors for forming Ge-doped silica glass in the preform laydown process. A drawback of using $GeO_2$ as an index-raising dopant for silica cores is that the presence of Ge increases the Rayleigh scattering of the fiber relative to pure silica fibers. As a result, there is interest in identifying alternate dopants that enable the refractive index profile control of silica needed in optical fibers to achieve fibers with low Rayleigh scattering at reasonable cost.

Two approaches for producing ultralow loss fibers have been have been commercialized. In one approach, a silica core is modified by alkali doping at low concentration (e.g. 0.1 wt % $K_2O$ or less). The alkali doping concentration is designed to be (1) high enough to reduce Rayleigh scattering by lowering the viscosity of the glass to a degree sufficient to produce a fiber core with a low fictive temperature and (2) sufficiently low to avoid increases in Rayleigh scattering resulting from compositional inhomogeneities. Since alkali doping at low concentration does not lead to a significant increase in the refractive index of the core relative to undoped silica, the refractive index profile is controlled by doping a surrounding silica cladding with F (fluorine). The presence of fluorine in the silica cladding reduces the refractive index of the cladding relative to undoped silica and provides a mechanism for achieving the core-cladding refractive index contrast needed for effective waveguiding in an optical fiber. The process required to make fibers with alkali-doped cores is complicated and expensive, but attenuation of ~0.15 dB/km over selected wavelengths in the 1300 nm-1500 nm range is possible.

A second approach to making lower loss fiber is to use Cl (chlorine) as a dopant in the core. Since chlorine doping can be accomplished in the consolidation step of preform fabrication, process variables (e.g. preform size, silica precursor) affecting costs associated with core fabrication can be re-optimized. The presence of Cl in the core, even at concentrations >1 wt % Cl, does not strongly influence the contribution of compositional inhomogeneity to Rayleigh scattering and fibers with Cl-doped cores exhibit low losses due to Rayleigh scattering. Regarding control of the refractive index profile, data indicate that the addition of 1 wt % Cl to the core increases the relative refractive index by about 0.08%. Since a higher core index relative to undoped silica is preferred for efficient waveguiding, proper control of the refractive index profile requires doping of the cladding with a dopant that decreases the relative refractive index. Fiber with Cl-doped silica cores typically include silica cladding doped with about 0.5 wt %-1 wt % F (fluorine) to achieve the proper differential in core-cladding refractive index needed for efficient waveguiding. A fiber with a Cl-doped silica core and an F-doped silica clad exhibits attenuation losses of 0.16 dB/km or lower.

Doping of the silica cladding with F is a cost-intensive step that would be desirable to eliminate. The need for F-doping of the cladding reflects a limitation in the maximum doping concentration of the core silica glass with Cl using conventional Cl doping processes. Under typical commercial process conditions, Cl doping of silica is limited to about 1 wt %. The relative refractive index increases associated with doping of a silica core with 1 wt % Cl is insufficient relative to an undoped silica glass cladding to provide the core-cladding index differential desired for efficient waveguiding in an optical fiber. As a result, the cladding is doped with F to lower the cladding index to achieve the preferred core-cladding index differential. It would be preferable to achieve a core Cl doping concentration high enough to achieve a sufficiently high core-cladding index using undoped silica or lightly F-doped silica for the cladding.

Efforts are underway to further increase Cl doping levels in the core, but have been limited by practical considerations of process equipment. Current preform fabrication processes are run in furnaces that are equipped to supply vapor phase constituents at atmospheric pressure or less. Cl doping of silica using $SiCl_4$, or other silicon chloride species, appears to show a thermodynamic equilibrium that limits the concentration of Cl ([Cl]) incorporated in silica to an amount consistent with the empirical relation: [Cl](wt %)=$2.3*P_{SiCl4}^{1/4}$, where $P_{SiCl4}$ is the partial pressure (in units of atmosphere) of the Cl-doping precursor ($SiCl_4$) over the glass. As a result, in a process with a maximum pressure of 1 atmosphere, the highest attainable Cl doping concentration in silica is 2.3 wt %. The relative refractive index increase relative to undoped silica for 2.3 wt % Cl doping is only about Δ=0.18%, which is insufficient to achieve fibers having adequate effective area and low bend losses when undoped silica is used as the cladding material. F-doping of the cladding is thus needed to increase the core-cladding index differential. Cl doping levels on the order of 4.5 wt % or higher are needed to achieve a core refractive index sufficiently high to obviate the need for fluorine doping of the cladding and to permit the use of undoped silica as a cladding material. Predicted process pressures for Cl doping on the order of 5 to 50 atmospheres are needed to achieve Cl doping concentrations that are sufficiently high to permit use of undoped silica as a cladding material.

As Cl doping concentrations of silica increase, it becomes more difficult to insure complete reaction of the Cl doping precursor with silica soot. During sintering of Cl-doped silica soot, for example, unreacted Cl doping precursor becomes encapsulated or entrapped as bubbles (gas-phase voids) in the silica body as the silica soot densifies to form a closed-pore silica body. When the Cl-doped silica body is intended for use as a preform for the core portion of an optical fiber, it is subjected to a redraw step to narrow and properly size the diameter of the preform to form a core cane. The core cane is subsequently used as s substrate for further deposition of soot to form a cladding or is integrated with a pre-fabricated cladding to form a fiber preform.

The presence of gas-phase voids of unreacted Cl doping precursor leads to a deterioration in the core cane product formed in the redraw process. More specifically, the high temperatures (~1800° C.) associated with the redraw process cause evolution of unreacted Cl doping precursor from the consolidated preform. Similar processing temperatures arise when drawing fibers Cl-doped silica. The evolution of Cl doping precursor leads to foaming of the preform or formation of large gas phase voids, which impair the optical transparency of both the core cane produced by the redraw process and the optical fiber ultimately drawn from the core cane. Similar complications arise for Br-doped silica during draw or redraw.

It is desirable to develop an optical fiber preform having a silica core with high halogen doping that is highly transparent. It further desirable to develop an optical fiber preform having a silica core with high halogen doping that exhibits minimal foaming and minimal gas phase voids in the high temperature heating processes encountered during draw or redraw.

SUMMARY

Preparation of clear void-free halogen-doped silica glass is described, wherein the halogen concentration is greater than 2 wt %. The halogen-doped silica glass can be used for preforms or core canes in the manufacture of optical fibers. The preparation includes doping a silica soot body with a gas-phase halogen doping precursor maintained at a high partial pressure to achieve a high halogen doping concentration and subjecting the halogen-doped silica soot body to a sintering process that includes two treatments. In a first sintering treatment, the halogen-doped silica soot body is sintered in the presence of the gas-phase halogen doping precursor from an initial soot state to a partially consolidated soot state. The partial pressure of the gas-phase halogen doping precursor is at least 2.0 atm as the halogen-doped silica soot body transforms to a partially consolidated soot body. The partially consolidated soot body has a density that is (1) less than 1.90 g/cm$^3$ and (2) at least 0.15 g/cm$^3$ greater than the density of the initial soot state. In some embodiments, the outer 1 mm of the partially consolidated soot body has a density of less than 1.9 g/cm$^3$. In other embodiments, the outer 1 mm of the partially consolidated soot body has a density of less than 1.7 g/cm$^3$. In further embodiments, the outer 1 mm of the partially consolidated soot body has a density of less than 1.5 g/cm$^3$.

In a second sintering treatment, the partially consolidated soot body is sintered to a closed-pore state. Transformation of the partially consolidated soot body to a closed-pore body occurs in the absence or presence of the gas-phase halogen doping precursor. When present in the second sintering treatment, the gas-phase halogen doping precursor maintained at a lower partial pressure than the partial pressure of the gas-phase halogen doping precursor in the first sintering treatment. The closed-pore body formed by the preparation includes little or no incorporation of unreacted gas-phase halogen precursor in voids or interstices and exhibits little or no tendency to foam or form gas-phase voids at the high processing temperatures encountered during drawing or redrawing processes. Core canes or fibers drawn from halogen-doped silica prepared from the process disclosed herein shows improved optical quality and possess fewer defects. The preparation is particularly advantageous when used for silica doped with high concentrations of halogen.

The present disclosure extends to:

A method of producing halogen-doped silica comprising:
  doping a silica soot body with a gas-phase doping precursor to form a doped silica soot body, the doped silica soot body having a density in the range from 0.25 g/cm$^3$ to 1.00 g/cm$^3$, the gas-phase doping precursor comprising a halogen and having a partial pressure of at least 2.0 atm; and
  sintering the doped silica soot body to a closed-pore state, the sintering comprising:
    a first sintering treatment, the first sintering treatment transforming the doped silica soot body to a partially consolidated silica soot body in the presence of the gas-phase doping precursor, the gas-phase doping precursor having a partial pressure of at least 2.0 atm during the first sintering treatment, the partially consolidated silica soot body having a density less than 1.90 g/cm$^3$ and at least 0.15 g/cm$^3$ greater than the density of the doped silica soot body; and
    a second sintering treatment, the second sintering treatment transforming the partially consolidated silica soot body to a closed-pore silica body, the closed-pore silica body having a density of at least 1.90 g/cm$^3$ and at least 0.05 g/cm$^3$ greater than the density of the partially consolidated silica soot body, the second sintering treatment occurring in a gas environment having a total pressure less than 1.0 atm.

The present disclosure extends to glasses made from the methods disclosed herein.

The present disclosure extends to halogen-doped silica made from the methods disclosed herein.

The present disclosure extends to optical fibers comprising glasses made from the methods disclosed herein.

The present disclosure extends to optical fibers comprising halogen-doped silica made from the methods disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
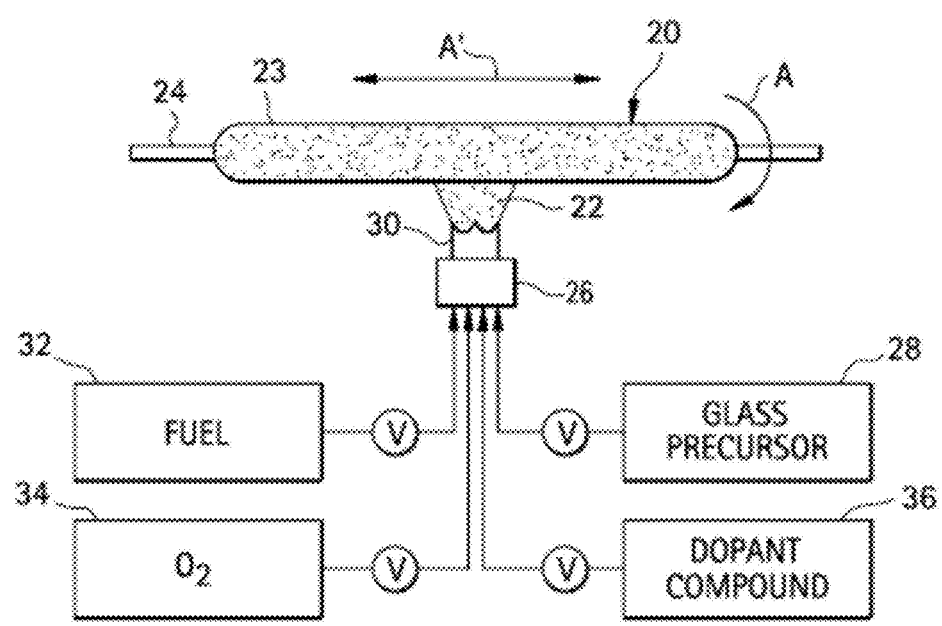
FIG. 1 is a schematic depiction of soot preform deposition via an OVD process.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims which follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "updopant" refers to an index-raising dopant and the term "downdopant" refers to an index-lowering dopant. When an updopant is incorporated into a base material, the refractive index of the doped material is higher than the refractive index of the base material. Updoped silica, for example, has a higher refractive index than undoped silica. When a downdopant is incorporated into a base material, the refractive index of the doped material is lower than the refractive index of the base material. Updoped silica, for example, has a higher refractive index than undoped silica. Downdoped silica, for example, has a lower refractive index than undoped silica. Updopants for silica include Cl and Ge. Downdopants for silica include B and F. Silica doped with an updopant is referred to as "updoped silica" and silica doped with a downdopant is referred to as "downdoped silica". The process of incorporating an updopant into a base composition is referred to as "updoping" and the process of incorporating a downdopant into a base composition is referred to as "downdoping".

Unless otherwise specified, "density" of a body refers to the average density of a body and "density" of a referenced portion of a body refers to the average density of the referenced portion.

Reference will now be made in detail to illustrative embodiments of the present description.

In a continuous optical fiber manufacturing process, an optical fiber is drawn from a heated preform positioned in a draw furnace. After drawing from the preform, the fiber is passed through a series of processing stages. Processing stages typically include metrology units (e.g. fiber diameter control) to assess quality and other characteristics of the optical fiber, heating stages, a primary coating stage, a secondary coating stage, an ink layer stage, and a spool or other winding stage to receive and store the coated optical fiber.

The properties of the optical fiber are determined to a large degree by the characteristics of the preform. The preform is a dense glass monolith with a diameter of about 27 cm and a length of about 200 cm. The preform includes a central core region surrounded by an annular cladding region. The composition of the core and cladding regions of the preform correspond to the compositions of the core and cladding regions of an optical fiber drawn from the preform. The core is typically silica doped with an updopant and the cladding is typically undoped silica or silica doped with a downdopant. The diameter of the core region of the preform and the thickness of the cladding region of the preform are in proportion to the core diameter and cladding thickness of a fiber drawn from the preform. For single mode fiber, the core diameter is typically ~10 µm and the cladding thickness is typically ~50 µm. The core region and/or cladding region of the preform may include multiple concentric layers that differ in dopant type or dopant concentration to provide optical fibers having a desired refractive index profile. Examples include a cladding region with an inner cladding region, trench region, and/or an outer cladding region.

Silica and doped silica for the core and cladding regions of an optical fiber preform can be produced by methods known in the art. Suitable methods include: flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot method, and doped deposited silica processes. A variety of CVD (chemical vapor deposition) and plasma-enhanced CVD processes are known and are suitable for producing silica or doped silica.

Formation of silica occurs through reaction or decomposition of a silica precursor. Suitable precursors for silica include OMCTS (octamethylcyclotetrasiloxane) and $SiCl_4$. Doping is accomplished with a doping precursor. The doping precursor can be introduced with the silica precursor in the deposition process or used to treat a body formed from a silica precursor. Preferred doping precursors include halogen-containing gases. Suitable precursors for doping silica with bromine include $SiBr_4$. Suitable precursors for doping silica with chlorine include $Cl_2$, $SiCl_4$, $Si_2Cl_6$, $Si_2OCl_6$, and $CCl_4$. Suitable precursors for doping silica with fluorine include $F_2$, $CF_4$, and $SiF_4$. The silica precursor and/or doping precursor is preferably provided as a gas to the deposition process. The gas-phase silica precursor or gas-phase doping precursor is supplied neat (undiluted) or in combination with a diluent gas (e.g. He, $N_2$, Ar).

Figure 2:
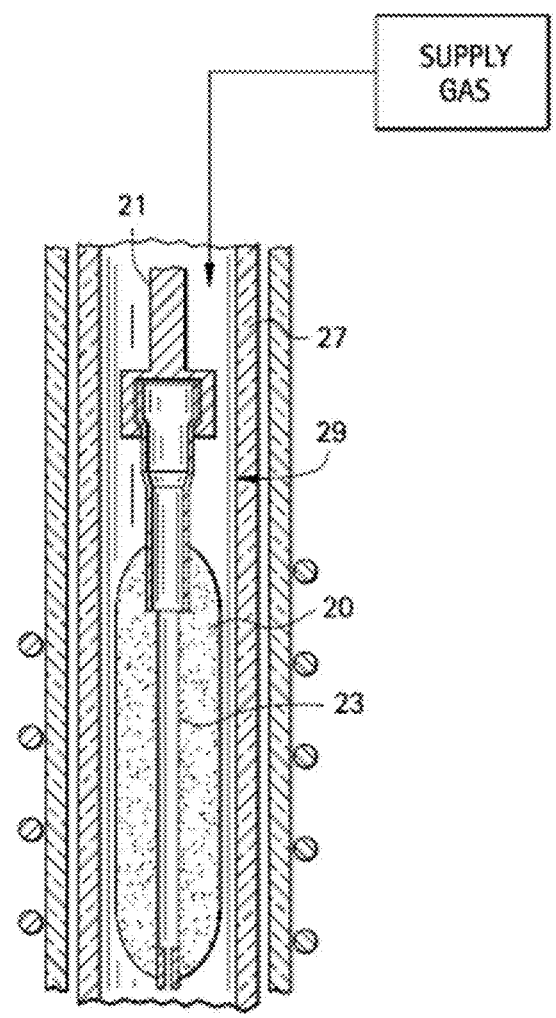
FIG. 2 depicts an apparatus for doping and consolidating a soot preform.

By way of illustration and not intended to be limiting, formation of silica or doped silica via formation of a silica soot body according to the OVD method is illustrated in FIGS. 1 and 2. In FIG. 1, silica soot body 20 is formed by depositing silica-containing soot 22 onto the outer surface of a rotating and translating mandrel 24. Mandrel 24 is preferably tapered. The soot 22 for silica soot body 20 is formed by providing a soot precursor 28 in gaseous form to the flame 30 of a burner 26 to oxidize, hydrolyze, combust, or otherwise react or decompose it. Fuel 32, such as methane ($CH_4$), and a combustion supporting gas 34, such as oxygen, are provided to the burner 26 and ignited to form the flame 30. Mass flow controllers, labelled V, meter the appropriate amounts of soot precursor 28, fuel 32 and combustion supporting gas 34, all preferably in gaseous form, to the burner 26. The soot precursor 28 is a glass former compound (e.g. silica precursor) and is oxidized in the flame 30 to form a generally cylindrically-shaped soot region 23. A soot body comprising silica (doped or undoped) is referred to herein as a silica soot body.

After forming the silica soot body, as illustrated in FIG. 2, the silica soot body 20 is optionally doped (e.g. with bromine, chlorine, fluorine) and sintered in furnace 29 to form a densified glass. Prior to sintering, the bait rod 24 illustrated in FIG. 1 is removed to form a hollow, cylindrical silica soot body. During the doping and sintering processes, the silica soot body 20 is suspended, for example, inside a pure quartz muffle tube 27 of the furnace 29 by a holding mechanism 21. Prior to or during sintering, the silica soot body 20 is optionally exposed to a doping precursor. The doping precursor is preferably provided in gas-phase form and is supplied directly to silica soot body 20 before or during sintering. In one embodiment, the gas-phase doping precursor is a vapor formed by heating or evaporating a liquid precursor. The gas-phase doping precursor is supplied neat (undiluted) or in combination with a diluent gas. The doping concentration of silica soot body 20 can be controlled by controlling, without limitation, the temperature of doping, the temperature of vaporization of a liquid doping precursor, the pressure or partial pressure of a gas-phase doping precursor in the processing ambient of the silica soot body during doping, the time of doping, the number of doping cycles, and the porosity or surface area of the silica soot body (high porosity and/or high surface area promote higher doping concentrations).

Figure 3:
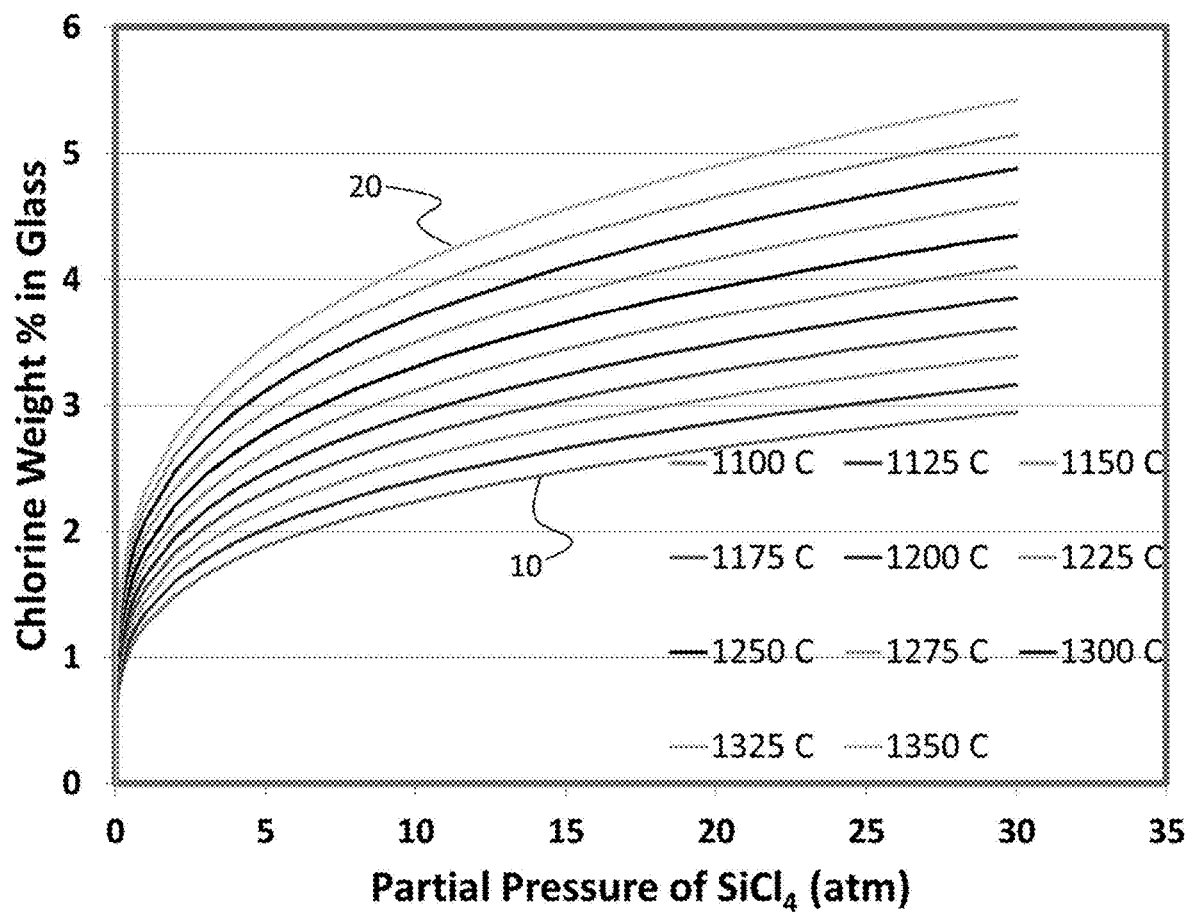
FIG. 3 shows the Cl dopant concentration in silica glass under various doping conditions in an OVD process.

FIG. 3 shows the Cl dopant concentration in silica made using the gas-phase doping precursor $SiCl_4$. The Cl concentration corresponds to the theoretical equilibrium concentration in silica after sintering the silica soot body to a closed-pore state and is shown as a function of the partial pressure of the gas-phase doping precursor $SiCl_4$ for various doping temperatures. Depending on the doping temperature and partial pressure of $SiCl_4$, Cl concentrations in silica up to about 5.25 wt % are achievable. The preferred Cl concentration in preforms (core preform, cladding preform, or combination thereof) or closed-pore bodies made from silica is at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %, or at least 5.5 wt %, or at least 6.0 wt%, or at least 6.5 wt %, or in the range from 1.0 wt % -8.0 wt %, or in the range from 1.5 wt %-7.5 wt %, or in the range from 2.0 wt %-7.0 wt %, or in the range from 2.5 wt %-6.5 wt %, or in the range from 3.0 wt %-6.0 wt %.

In some embodiments, the partial pressure of $SiCl_4$ at which chlorine doping is performed is greater than 30 atmospheres. In other embodiments, the partial pressure of $SiCl_4$ at which chlorine doping is performed is greater than 40 atmospheres. In still other embodiments, the partial pressure of $SiCl_4$ at which chlorine doping is performed is greater than 45 atmospheres. In some embodiments, the Cl concentration in the preform is greater than 5 wt %. In other embodiments, the Cl concentration in preform is greater than 6 wt %. In still other embodiments, the Cl concentration in preform is greater than 6.5 wt %.

Figure 4:
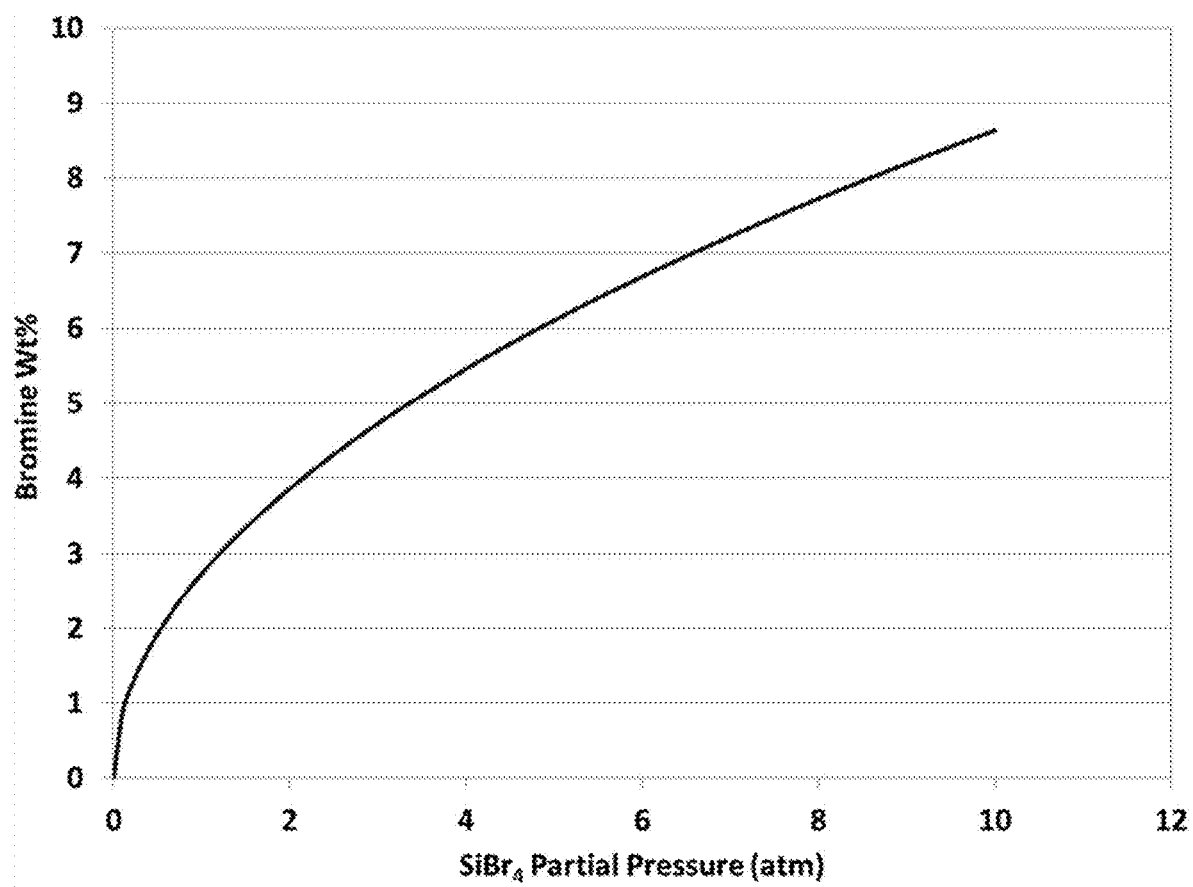
FIG. 4 shows the Br dopant concentration in silica glass under various doping conditions in an OVD process.

FIG. 4 shows the Br dopant concentration in silica made by an OVD process using the gas-phase doping precursor $SiBr_4$. A downdrive process was used for $SiBr_4$ doping. The Br concentration corresponds to the concentration in silica after sintering the silica soot body to a closed-pore state and is shown as a function of the partial pressure of the doping precursor $SiBr_4$ for a doping temperature near the temperature at which the closed-pore state is achieved (approximately of 1330° C. Doping concentrations up to 8.5 wt % Br in silica are achievable. The preferred Br concentration in preforms (core preform, cladding preform, or combination thereof) or closed-pore bodies made from silica is at least 1.0 wt %, or at least 1.5 wt %, or at least 2.0 wt %, or at least 2.5 wt %, or at least 3.0 wt %, or at least 3.5 wt %, or at least 4.0 wt %, or at least 4.5 wt %, or at least 5.0 wt %, or at least 5.5 wt %, or in the range from 1.0 wt %-8.5 wt %, or in the range from 1.5 wt %-7.0 wt %, or in the range from 2.0 wt %-5.5 wt %, or in the range from 2.5 wt %-4.5 wt %.

During or after the doping step, the silica soot body is sintered to densify the silica soot body to form a closed-pore body. In typical prior art processes, sintering occurs at temperatures in the range from 1100° C. to 1600° C. In some instances, sintering is an isothermal process and in other instances, sintering occurs at a series of different temperatures. In other prior art processes, sintering is a downdrive process in which a sintering front is established by localized heating and the gas-phase doping precursor is provided at the sintering front at a concentration (neat or in combination with a diluent) sufficient to accommodate the equilibrium solubility. Depending on the size of the silica soot body, the thermal conductivity of the silica soot body, and the heating (downdrive) rate of the silica soot body, the sintering front may include a radial temperature gradient. That is, at the sinter front, the outer surface of the silica soot body is exposed to high temperatures and heated and heating of the interior portion follows in time as heat transfers from the outer surface to the interior of the silica soot body. Sintering at a sufficiently high temperature for a sufficiently long period of time transforms the silica soot body to a denser closed-pore state.

The OVD method described above can also be used to form a core soot body or a cladding soot body from a silica precursor and a doping precursor as well as a closed-pore state for a core soot body or a cladding soot body. Multilayer core soot bodies and multilayer cladding soot bodies can be obtained by varying the doping conditions during soot deposition. Doping conditions include time of doping, doping precursor, temperature of doping, and pressure of doping. Layers that differ in thickness, dopant type, and doping concentration can be deposited concentrically when forming a core soot body or a cladding soot body.

An optical fiber preform is glass that includes a core region surrounded by a cladding region. Various methods for forming an optical fiber preform are known. In the OVD method described above, for example, one or more concentric core soot layers can be formed, one or more concentric cladding soot layers can be formed on the outermost of the one or more concentric core layers, and the resulting soot body can be sintered to a closed-pore state to provide a preform with a central core region surrounded by an annular cladding region.

In another method, a core soot body is formed, the core soot body is sintered to a closed-pore state, one or more concentric layers of cladding soot are deposited on the closed-pore core body, and the one or more concentric layers of cladding soot are sintered to a closed-pore state to provide a preform with a central core region surrounded by an annular cladding region.

In a further method, a core soot body is formed and sintered to a closed-pore state. A cladding soot body or a closed-pore cladding body is formed independent of the closed-pore core body. The closed-pore core body is then integrated with the cladding soot body or closed-pore cladding body and consolidated to provide a preform with a central core region surrounded by an annular cladding region. By way of example, a cladding soot body (with one or more layers of one or more compositions) can be formed by soot deposition on a mandrel. Upon completion of soot deposition, the mandrel is removed to provide an annular cladding soot body with a central cavity. A closed-pore core body is then inserted in the central cavity and the resulting assembly is sintered to densify the soot cladding to a closed-pore state to form a preform with a central core region surrounded by an annular cladding region.

During preform fabrication or optical fiber manufacture, it is often necessary to heat closed-pore bodies to temperatures above the temperature range of sintering. Drawing a fiber from a preform, for example, typically requires heating the preform to temperatures of ~1800° C. to soften it so that a fiber can be pulled from the preform. As a second example, formation of a preform from a closed-pore core body often requires sizing the closed-pore core body to a specified diameter. From a process economics standpoint, it is preferable to form a large diameter closed-pore core body and to then reduce the dimensions of the closed-pore core body to a selected diameter. After diameter reduction, the closed-pore core body can be cut to a desired length to form a core cane. The core cane can be used as a substrate for deposition of one or more layers of cladding soot or integrated with a cladding soot body or closed-pore cladding body as described above to form a preform. The process of forming a core cane from a closed-pore core body requires heating the closed-pore core body to a temperature of ~1800° C. to soften it so that it can be pulled and thinned to a specified diameter. The process of forming a core cane from a closed-pore core body is referred to herein as a "redraw process" or "redrawing".

The present inventors have determined that drawing fibers from preforms having a closed-pore core region and a closed-pore cladding region and redrawing closed-pore core bodies to form core canes leads to degradation in the closed-pore region or closed-pore body when the closed-pore region or closed-pore body is made from silica with a high halogen doping concentration. Without wishing to be bound by theory, it is believed that the degradation observed during the heating needed for drawing fibers or redrawing core canes leads to evolution (e.g. evaporation, exsolution, or other release from the closed-pore structure) or migration (e.g. diffusion or other motion within the closed-pore structure) of gases trapped in the closed-pore structure and that such evolution or migration leads to formation of gas phase voids in the closed-pore structure or foaming of the closed-pore structure.

The following discussion describes the degradation in the context of redrawing closed-pore core bodies to form core canes for Cl-doped silica prepared using $SiCl_4$ as a doping precursor. It should be understood, however, that the discussion applies analogously to closed-pore bodies generally, including closed-pore core bodies and closed-pore cladding bodies as well as closed-pore core and closed-pore cladding regions of a fiber preform. The discussion further applies to halogen dopants other than Cl and to halogen doping precursors other than $SiCl_4$.

Figure 5:
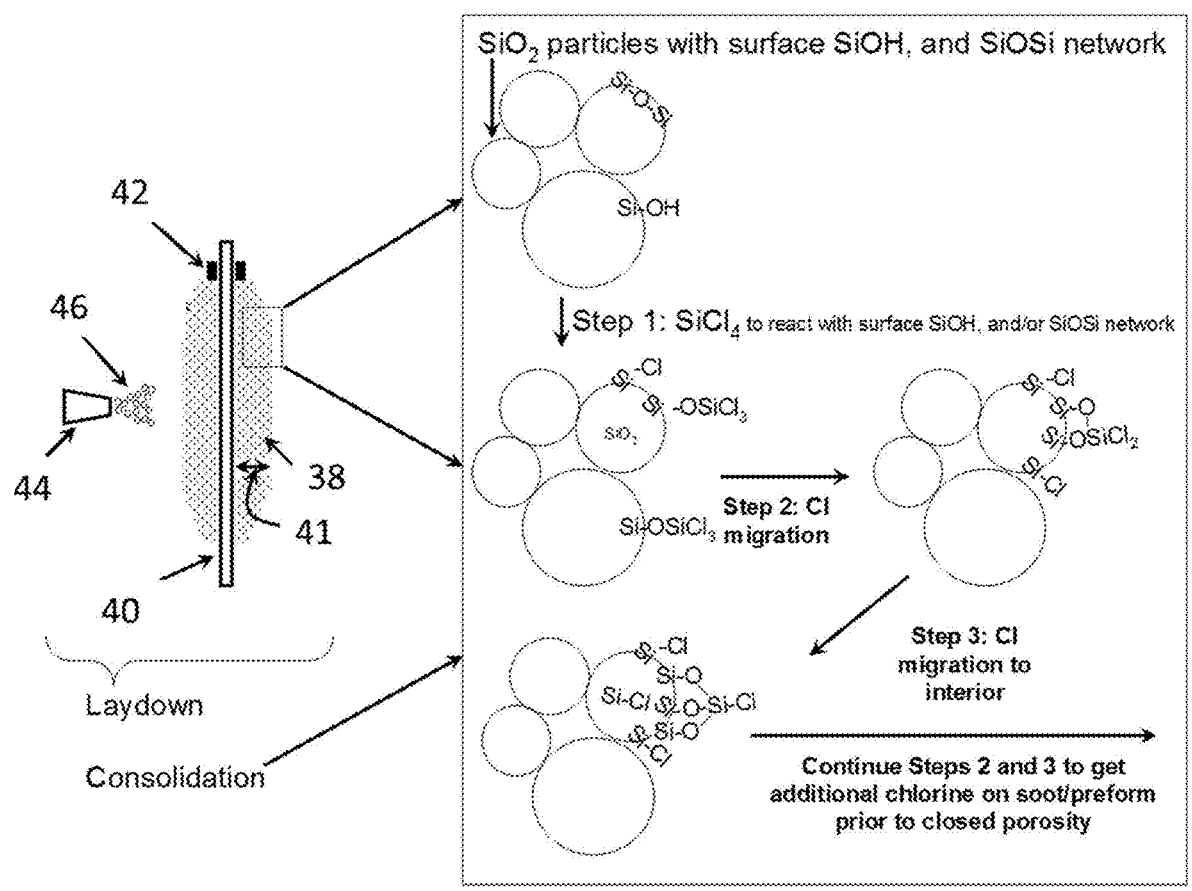
FIG. 5 depicts evolution of the structure of a silica soot body during doping with Cl.

FIG. 5 illustrates the process of doping a core silica soot body formed by an OVD process with Cl using $SiCl_4$ as a doping precursor. Core silica soot body 38 is formed on removable mandrel 40, which is held by handle 42, via deposition of silica soot particles 46 produced from a silica precursor combusted by burner 44. Core silica soot body 38 has thickness 41. The right side of FIG. 5 shows an enlargement of core silica soot body 38 and the evolution of structure during Cl doping. Core silica soot body 38 is a porous (open pore) silica body and doping occurs by exposing core silica soot body 38 to gas-phase $SiCl_4$. In a first step of the doping process, the $SiCl_4$ reacts with Si—OH and Si—O—Si groups on the surface of the core silica soot body to form Si—Cl and Si—O—$SiCl_3$ bonds on the surface. As doping proceeds, additional Cl bonds form on the surface and Cl migrates along the surface to produce a higher concentration and more uniform coverage of the surface with Cl. At later times in the doping process, Cl migrates from the surface to the interior of the core silica soot body. The process is continued by providing a fresh supply of $SiCl_4$ and controlling the doping conditions to achieve a desired doping concentration. Doping is preferably completed while the core silica soot body remains in an open-pore state.

As pores close, the core silica soot body transforms from an open-pore state to a closed-pore state. In the open-pore state, continuous channels exist within the structure of the core silica soot body and the doping precursor distributes throughout the structure of the core silica soot body. As pores close during sintering, the channels narrow and seal to form a series of discrete, non-continuous voids as the closed-pore structure is produced. Due to the high viscosity of silica, a portion of the gas-phase $SiCl_4$ gets encapsulated in unreacted form in the structure and becomes trapped in voids or interstitial regions of the closed-pore structure. It is believed that evolution of trapped $SiCl_4$ at the high temperatures encountered during subsequent redrawing or drawing processes leads to degradation of the closed-pore core silica body.

Figure 6:
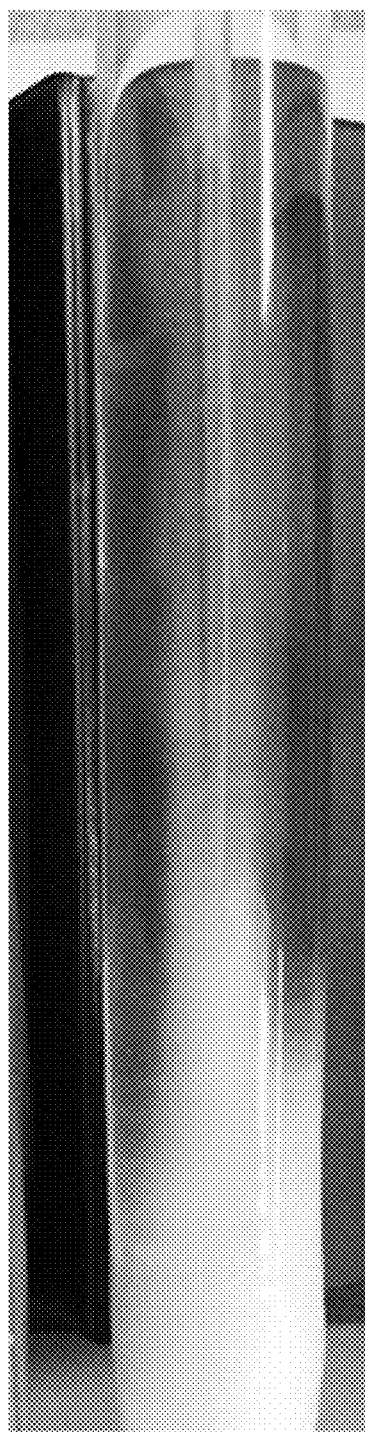
FIG. 6 shows a closed-pore Cl-doped silica body.
Figure 7:
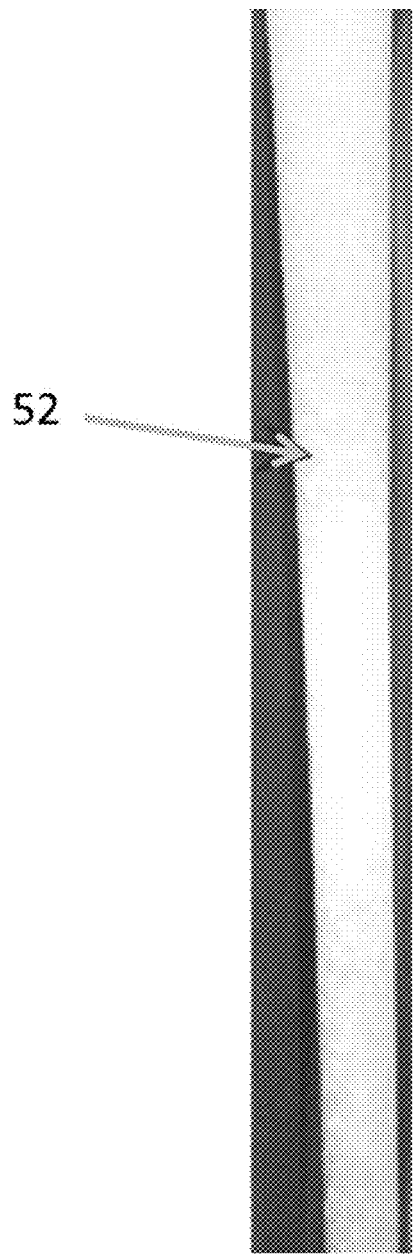
FIG. 7 shows a core cane redrawn from the closed-pore Cl-doped silica body shown in FIG. 6.

FIG. 6 shows a closed-pore core body of Cl-doped silica glass formed in a conventional sintering process. The closed-pore core silica body was made in an OVD process using OMCTS as the silica precursor and $SiCl_4$ as the doping precursor for Cl. A silica soot body was formed on a mandrel and then exposed to $SiCl_4$ to achieve Cl doping. The doping conditions included a partial pressure of $SiCl_4$ of 5.8 atm and a hold time of 90 min at 1440° C. Sintering of the core soot body to a closed-pore state occurred during doping. After doping, the core silica soot body was cooled to room temperature. FIG. 6 shows the resulting closed-pore silica body. The Cl concentration of the closed-pore silica body was 3.3 wt %. Optical inspection of the closed-pore silica body revealed the presence of gas-phase voids throughout the volume of the closed-pore silica body. The white haze shown in the lower part of the closed-pore body corresponds to regions having a high concentration of voids. When the closed-pore silica body shown in FIG. 6 was heated to about 1800° C. in a redraw process, extensive foaming was observed and a hazy core cane was produced (see core cane 52 in FIG. 7).

Figure 8:
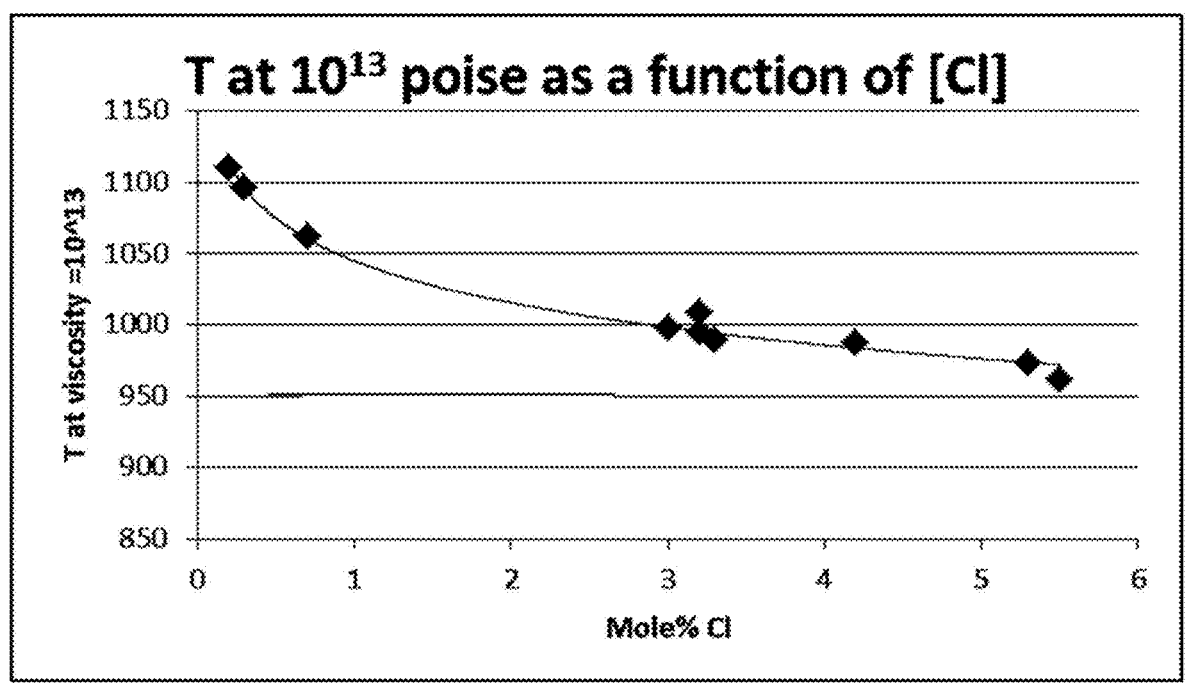
FIG. 8 shows viscosity data for Cl-doped silica glass.

It is believed that foaming becomes more problematic as the viscosity of glass decreases. As is known in the art, heating of glass reduces viscosity. When glass containing unreacted gases in voids or interstices is heated and the viscosity of the glass decreases below a foaming threshold, release of the gases causes foaming. Halogen dopants exacerbate foaming because the presence of halogens in the structure of silica glass reduces the viscosity of silica glass. FIG. 8, for example, shows the effect of Cl doping on the viscosity of silica glass. The temperature at which the viscosity of Cl-doped silica glass is $10^{13}$ Poise as a function of Cl doping concentration is shown. The data indicate that as the doping concentration of Cl increases the temperature at which the viscosity is $10^{13}$ Poise decreases. The data show that the viscosity of Cl-doped silica glass at a particular temperature decreases with increasing Cl doping concentration. Since the severity of foaming increases as glass viscosity decreases, the data indicate that foaming becomes more problematic as the doping concentration of Cl increases. As a result, as Cl doping concentration increases, it becomes necessary to carefully control the processing conditions of the glass to avoid foaming.

The present disclosure provides a method to reduce or eliminate foaming, gas-phase void formation or expansion, or other degradation of closed-pore bodies that occurs when drawing to form fibers or redrawing to form core canes. The method recognizes the presence of gas(es) trapped in voids or interstices of closed-pore bodies and recognizes that release of trapped gas(es) from voids or interstices of closed-pore bodies upon heating leads to foaming, void formation, void enlargement, and other degradation. The present method is directed to reducing the concentration of gases in the pores of a silica soot body before the silica soot body sinters to a closed-pore state. Removal of gases from the silica soot body is readily accomplished while the silica soot body is in an open-pore state. In the open-pore state, continuous channels pass throughout the silica soot body and evacuation of gases is readily accomplished. Removal of gases from the silica soot body before transformation of the silica soot body to a closed-pore state decreases the amount of gas available for internal encapsulation when the closed-pore state is reached. As a result, the concentration of gases trapped in voids or interstices of the closed-pore body is reduced and problematic foaming, void formation, and void expansion that occur during draw or redraw is ameliorated.

The present method includes doping a silica soot body with a high concentration of halogen and sintering the doped silica soot body to a closed-pore state. A silica soot body is formed, doped, and sintered to a closed-pore state. Transformation of the silica soot body from its initial state upon deposition to a closed-pore state is accompanied by a progressive increase in density. In the initial state formed upon deposition, the density of the silica soot body is in the range from 0.25 g/cm³-1.00 g/cm³. The structure of the silica soot body in the initial state is highly porous with continuous channels and a significant pore volume. Sintering induces a reduction in pore volume and an increase in the density of the silica soot body. Sintering continues until a closed-pore state is reached. As used herein, a closed-pore state of silica is a state having a density of at least 1.90 g/cm³. A body in a closed-pore state is referred to herein as a closed-pore body. Silica in a closed-pore state is referred to herein as a closed-pore silica body. Intermediate states between the initial state and closed-pore state are referred to herein as partially consolidated states. Partially consolidated states have a density intermediate between the density of the initial state of the silica soot body and the minimum density of the closed-pore state of silica (1.90 g/cm³). Partially consolidated states have a porosity intermediate between the porosity of the initial state and the porosity of the closed-pore state. A soot body in a partially consolidated state is referred to as a partially consolidated soot body. Silica in a partially consolidated state is referred to herein as a partially consolidated silica soot body. An open-pore state is the initial state or a partially consolidated state.

Doping is accomplished by exposing the silica soot body to a gas-phase doping precursor. Doping occurs when the silica soot body is in its initial state or a partially consolidated state. In one embodiment, doping commences while the silica soot body is in its initial state and continues as the silica soot body is transformed to a partially consolidated state. In another embodiment, doping commences while the silica soot body is in a partially consolidated state and continues as the silica soot body is transformed to a denser partially consolidated state. The porosity of open-pore states facilitates distribution of the gas-phase doping precursor throughout the silica soot body and promotes greater uniformity in doping. Doping ceases while the silica soot body is in an open-pore state.

The gas-phase doping precursor is preferably a gas-phase halogen doping precursor. Gas-phase halogen doping precursors include $Cl_2$, $SiCl_4$, $SiCl_6$, $Si_2OCl_6$, $CCl_4$, $SiBr_4$, $Br_2$, HBr, $F_2$, $CF_4$, $C_2F_6$, $SF_6$, and $SiF_4$. Doping with the gas-phase halogen doping precursor occurs with or without a diluent gas. Preferred diluent gases have low solubility in silica. Diluent gases include He, Ne, Ar, Kr, Xe, $O_2$, $SO_2$, $N_2$, CO, $CO_2$, and combinations thereof. The concentration of the gas-phase halogen doping precursor in the doping environment is expressed herein as a partial pressure. When the gas-phase halogen doping precursor is supplied without a diluent gas, the partial pressure of the gas-phase halogen doping precursor corresponds to the pressure of the gas-phase halogen doping precursor.

To achieve high halogen doping concentration, it is preferable to complete doping in an environment that includes a high partial pressure of the gas-phase halogen doping precursor. The partial pressure of a gas-phase halogen doping precursor during doping of a silica soot body is preferably at least 1.0 atm, or at least 2.0 atm, or at least 5.0 atm, or at least 10.0 atm, or at least 20.0 atm, or at least 30.0 atm, or at least 40.0 atm, or at least 50.0 atm, or in the range from 1.0 atm-60.0 atm, or in the range from 2.0 atm-50.0 atm, or in the range from 3.0 atm-40.0 atm, or in the range from 5.0 atm-30.0 atm. The temperature of doping is in the range from 800° C.-1500° C., or in the range from 1000° C.-1500° C., or in the range from 1100° C.-1400° C. The time of doping is in the range from 5 min-360 min, or in the range from 15 min-300 min, or in the range from 30 min-240 min, or in the range from 60 min-180 min.

Sintering of the doped silica soot body includes a high pressure sintering treatment and a low pressure sintering treatment. The high pressure sintering treatment transforms a doped silica soot body to a partially consolidated state in the presence of the gas-phase halogen doping precursor, where the partial pressure of the gas-phase halogen precursor is is at least 1.0 atm, or at least 2.0 atm, or at least 5.0 atm, or at least 10.0 atm, or at least 15.0 atm, or at least 20.0 atm, or at least 30.0 atm, or at least 40.0 atm, or at least 50.0 atm, or in the range from 1.0 atm-60.0 atm, or in the range from 2.0 atm-50.0 atm, or in the range from 3.0 atm-40.0 atm, or in the range from 5.0 atm-30.0 atm.

The doped silica soot body subjected to the high pressure sintering treatment has a density in the range from 0.25 g/cm$^3$-1.00 g/cm$^3$, or a density in the range from 0.35 g/cm$^3$-0.90 g/cm$^3$, or a density in the range from 0.45 g/cm$^3$-0.80 g/cm$^3$. The partially consolidated silica soot body produced by the high pressure sintering treatment has a density less than 1.90 g/cm$^3$, or a density less than 1.80 g/cm$^3$, or a density less than 1.70 g/cm$^3$, or a density less than 1.60 g/cm$^3$, or a density in the range from 1.10 g/cm$^3$-1.89 g/cm$^3$, or a density in the range from 1.20 g/cm$^3$-1.80 g/cm$^3$, a density in the range from 1.30 g/cm$^3$-1.70 g/cm$^3$ and a density that is greater than the density of the doped silica soot body by at least 0.15 g/cm$^3$, or at least 0.35 g/cm$^3$, or at least 0.55 g/cm$^3$, or at least 0.75 g/cm$^3$, or at least 0.95 g/cm$^3$, or at least 1.15 g/cm$^3$, or at least 1.35 g/cm$^3$, or by an amount in the range from 0.15 g/cm$^3$-1.60 g/cm$^3$, or by an amount in the range from 0.45 g/cm$^3$-1.50 g/cm$^3$, or by an amount in the range from 0.65 g/cm$^3$-1.40 g/cm$^3$, or by an amount in the range from 0.85 g/cm$^3$-1.30 g/cm$^3$.

In some embodiments, it is recognized that the density of the partially consolidated silica soot body is non-uniform. The temperature of the doped silica soot body during the high pressure sintering treatment, for example, may be non-uniform due to differences in the proximity of different portions of the doped silica soot body to the heating elements of a furnace and timescales associated with diffusion of thermal energy within the doped silica soot body. In one embodiment, the density of the outer radial portion of the partially consolidated silica soot body is greater than the density of the inner radial portion of the partially consolidated silica soot body. Radial position is defined by a radial coordinate r that increases from r=0 along the central axis of a soot body to a maximum value at the outermost surface of the soot body. The central axis of a soot body coincides with the long axis of the cylindrical shape of the soot body and is aligned along the center of mandrel 24 (see FIG. 1). The radial direction is normal to the central axis. Inner radial portions of a soot body are surrounded by outer radial portions of a soot body. The outermost radial position of a soot body corresponds to the radius of the soot body.

In some embodiments, the partially consolidated soot body produced by the high pressure sintering treatment includes an annular region of thickness 1 mm extending from the outermost radial position toward the center that has a density less than 1.9 g/cm$^3$, or a density less than 1.7 g/cm$^3$, or a density of less than 1.5 g/cm$^3$.

The temperature of the high pressure sintering treatment is in the range from 800° C.-1500° C., or in the range from 1000° C.-1500° C., or in the range from 1100° C.-1400° C. The high pressure sintering treatment occurs in the presence or absence of a diluent gas. In one embodiment, the halogen doping concentration increases during the high pressure sinter treatment.

The low pressure sintering treatment transforms the partially consolidated silica soot body formed in the high pressure sintering treatment to a closed-pore state. The partial pressure of the gas-phase halogen doping precursor in the low pressure sintering treatment is less than 1.0 atm, or less than 0.5 atm, or less than 0.3 atm, or less than 0.1 atm, or less than 0.05 atm, or less than 0.01 atm, or in the range from 0.001 atm-0.5 atm, or in the range from 0.01 atm-0.4 atm, or in the range from 0.1 atm-0.3 atm. In one embodiment, the low pressure sintering treatment occurs in the absence of the gas-phase halogen doping precursor. The closed-pore silica body has a density of at least 1.90 g/cm$^3$, or at least 1.95 g/cm$^3$, or at least 2.00 g/cm$^3$, or at least 2.05 g/cm$^3$, or in the range from 1.90 g/cm$^3$-2.15 g/cm$^3$, or in the range from 1.95 g/cm$^3$-2.10 g/cm$^3$ and a density that is greater than the density of the partially consolidated silica soot body by at least 0.05 g/cm$^3$, or at least 0.10 g/cm$^3$, or at least 0.15 g/cm$^3$, or at least 0.20 g/cm$^3$, or at least 0.25 g/cm$^3$, or at least 0.30 g/cm$^3$, or at least 0.35 g/cm$^3$, or by an amount in the range from 0.05 g/cm$^3$-0.50 g/cm$^3$, or by an amount in the range from 0.10 g/cm$^3$-0.45 g/cm$^3$, or by an amount in the range from 0.15 g/cm$^3$-0.40 g/cm$^3$, or by an amount in the range from 0.20 g/cm$^3$-0.35 g/cm$^3$. The temperature of the low pressure sintering treatment is in the range from 800° C.-1500° C., or in the range from 1000° C.-1500° C., or in the range from 1100° C.-1400° C. The low pressure sintering treatment occurs in the presence or absence of a diluent gas. If a diluent gas is present, the total pressure of all gases combined in the low pressure sintering treatment is less than 1.0 atm, or less than 0.50 atm, or less than 0.25 atm, or less than 0.10 atm., or less than 0.05 atm, or less than 0.01 atm, or in the range from 0.001 atm-0.90 atm, or in the range from 0.01 atm-0.80 atm, or in the range from 0.10 atm-0.70 atm, or in the range from 0.15 atm-0.60 atm.

Commencement of drawing or redrawing preferably occurs after conclusion of the low pressure sintering treatment. The temperature of drawing or redrawing is at least 1650° C., or at least 1700° C., or at least 1750° C., or at least 1800° C.

The sintering treatment described herein is effective in reducing or preventing foaming in a closed-pore silica body doped with a halogen, where the concentration of the halogen in the closed-pore silica body is greater than 1.0 wt %, or greater than 1.5 wt %, or greater than 2.0 wt %, or greater than 2.5 wt %, or greater than 3.0 wt %, or greater than 3.5 wt %, or greater than 4.0 wt %, or greater than 4.5 wt %, or greater than 5.0 wt %, or greater than 5.5 wt %, or greater than 6.0 wt %, or greater than 6.5 wt %, or in the range from 1.0 wt %-8.0 wt %, or in the range from 1.5 wt %-7.5 wt %, or in the range from 2.0 wt %-7.0 wt %, or in the range from 2.5 wt %-6.5 wt %, or in the range from 3.0 wt %-6.0 wt %, or in the range from 1.75 wt %-3.25 wt %, or in the range from 2.0 wt %-3.0 wt %.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of producing halogen-doped silica comprising:
    doping a silica soot body with a gas-phase doping precursor to form a doped silica soot body, the doped silica soot body having a density in the range from 0.25 g/cm$^3$ and 1.00 g/cm$^3$, the gas-phase doping precursor comprising a halogen and having a partial pressure of at least 2.0 atm; and
    sintering the doped silica soot body to a closed-pore state, the sintering comprising:
        a first sintering treatment, the first sintering treatment transforming the doped silica soot body to a partially consolidated silica soot body in the presence of the gas-phase doping precursor, the gas-phase doping precursor having a partial pressure of at least 2.0 atm during the first sintering treatment, the partially consolidated silica soot body having a density less than 1.90 g/cm$^3$ and at least 0.15 g/cm$^3$ greater than the density of the doped silica soot body; and
        a second sintering treatment, the second sintering treatment transforming the partially consolidated silica soot body to a closed-pore silica body, the closed-pore silica body having a density of at least 1.90 g/cm$^3$ and at least 0.05 g/cm$^3$ greater than the density of the partially consolidated silica soot body, the second sintering treatment occurring in a gas environment having a total pressure less than 1.0 atm.

2. The method of claim 1, wherein the doped silica soot body has a density in the range from 0.45 g/cm$^3$ and 0.80 g/cm$^3$.

3. The method of claim 1, wherein the halogen comprises Cl or Br.

4. The method of claim 1, wherein the gas-phase doping precursor comprises $SiCl_4$ or $SiBr_4$.

5. The method of claim 1, wherein the doping comprises a gas-phase doping precursor having a partial pressure of at least 10.0 atm.

6. The method of claim 1, wherein the doping occurs at a temperature in the range from 1000° C.-1500° C.

7. The method of claim 1, wherein the partially consolidated silica soot body has a density in the range from 1.20 g/cm$^3$-1.80 g/cm$^3$.

8. The method of claim 1, wherein the partially consolidated silica soot body has a density at least 0.55 g/cm$^3$ greater than the density of the doped silica soot body.

9. The method of claim 1, wherein the partially consolidated soot body includes an annular region of thickness 1 mm extending from the outermost radial position toward the center, the annular region having a density less than 1.7 g/cm$^3$.

10. The method of claim 1, wherein the first sintering treatment comprises a gas-phase doping precursor having a partial pressure of at least 5.0 atm.

11. The method of claim 1, wherein the first sintering treatment occurs at a temperature in the range from 1000° C.-1500° C.

12. The method of claim 1, wherein the first sintering treatment occurs in the presence of a diluent gas selected from the group consisting of He, Ne, Ar, Kr, Xe, $O_2$, $SO_2$, $N_2$, CO and $CO_2$.

13. The method of claim 1, wherein the closed-pore silica body has a density of at least 2.00 g/cm$^3$.

14. The method of claim 1, wherein the closed-pore silica body has a density at least 0.15 g/cm$^3$ greater than the density of the partially consolidated silica soot body.

15. The method of claim 1, wherein the second sintering treatment comprises a gas environment comprising a diluent gas selected from the group consisting of He, Ne, Ar, Kr, Xe, $O_2$, $SO_2$, $N_2$, CO and $CO_2$.

16. The method of claim 1, wherein the second sintering treatment comprises a gas environment comprising the gas-phase doping precursor, the gas-phase doping precursor having a partial pressure less than 0.3 atm during the second sintering treatment.

17. The method of claim 1, wherein the second sintering treatment comprises a gas environment having a total pressure less than 0.25 atm.

18. The method of claim 1, wherein the second sintering treatment comprises a gas environment having a total pressure less than 0.01 atm.

19. The method of claim 1, wherein the concentration of the halogen in the closed-pore silica body is greater than 2.0 wt %.

20. The method of claim 1, wherein the concentration of the halogen in the closed-pore silica body is greater than 5.0 wt %.

* * * * *